United States Patent Office 2,719,849
Patented Oct. 4, 1955

2,719,849

β-(1,2,4-TRIAZOLYL-3)-ALANINE AND ITS SALTS AND THE PREPARATION THEREOF

Cameron Ainsworth and Reuben G. Jones, Indianapolis, Ind., assignors to Eli Lilly and Company, Indianapolis, Ind., a corporation of Indiana No Drawing. Application February 4, 1954, Serial No. 408,288

8 Claims. (Cl. 260—308)

This invention relates to a novel amino acid and its salts. More particularly, it relates to a substituted alanine and its salts.

The novel amino acid of this invention is β-(1,2,4-triazolyl-3)-alanine, and can be represented by the following conventional formula:

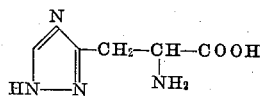

Because of the presence of both carboxyl and amine groups in the amino acid, the compound, like other amino acids, forms a zwitter-ion. Moreover, the multiplicity of acidic and basic groupings in the molecule permits the formation of both mono- and di-salts with cations and anions. Illustrative examples of anionic salts include the hydrochloride, hydrobromide, sulfate, phosphate, trichloroacetate, benzene-sulfonate salts, and the like. Illustrative examples of cationic salts include the sodium, potassium, calcium, barium, silver, mercury, ammonium, substituted ammonium salts, and the like.

β-(1,2,4-triazolyl-3)-alanine can be prepared by the following series of reactions: 3-(1,2,4-triazole)-carboxylic acid, prepared by the method of Andreocci [Beilstein 26, 280 (1937)] is esterified, and the ester is reduced to the corresponding carbinol. The hydrochloride of this carbinol is formed and is then converted to 3-chloromethyl-1,2,4-triazole hydrochloride by treatment with thionyl chloride. The 3-chloro compound is condensed with diethyl formylaminomalonate or diethyl acetamidomalonate in the presence of a sodium ethylate and the condensation product, the α - acylamino - α - (1,2,4 - triazolyl methyl)-malonic ester is hydrolysed and decarboxylated in an acid medium, yielding an acid addition salt of β-(1,2,4-triazolyl-3)-alanine.

This series of transformations can be represented by the following equation:

the free amino acid, followed by isolation of the amino acid.

The compounds of this invention are useful chemical intermediates. For example, β-(1,2,4-triazolyl-3)-alanine, can be decarboxylated to 3-(β-aminoethyl)-1,2,4-triazole, an antihypertensive agent disclosed in our co-pending application, Serial No. 348,554, filed April 13, 1953. In addition, β-(1,2,4-triazolyl-3)-alanine and its salts are useful as metabolic blockers or antagonists for histidine.

Detailed methods for the preparation of illustrative compounds of this invention are as follows:

EXAMPLE 1

β-(1,2,4-TRIAZOLYL-3)-ALANINE

*Preparation of ethyl 3-(1,2,4-triazole)-carboxylate*

32 g. of 3-(1,2,4-triazole)-carboxylic acid are suspended in 500 ml. of absolute ethanol and saturated with gaseous hydrogen chloride at 0° C. The mixture is allowed to stand for three days at room temperature. The solvent is then removed in vacuo and the resulting solid residue, consisting of ethyl 3-(1,2,4-triazole)-carboxylate hydrochloride, is washed with saturated sodium bicarbonate solution. At this point, the quantity of solid ethyl 3-(1,2,4-triazole)-carboxylate which precipitates is separated by filtration. The filtrate is extracted with ethyl acetate, and on removal of the ethyl acetate in vacuo, a further quantity of ethyl 3-(1,2,4-triazole)-carboxylate remains. The solid ester fractions are combined and recrystallized from absolute ethanol. 24 g. of crystalline ethyl 3-(1,2,4-triazole)-carboxylate melting at about 178° C. is obtained.

*Analysis.*—Calculated for $C_5H_7N_3O_2$: C, 42.55; H, 5.00; N, 29.78. Found: C, 42.33; H. 4.81; N, 29.79.

*Preparation of 3-hydroxymethyl-1,2,4-triazole hydrochloride*

To a mixture of 8.5 g. of lithium aluminum hydride and 200 ml. of tetrahydrofuran is added a solution of 32 g. of ethyl 3-(1,2,4-triazole)-carboxylate in 500 ml. of tetrahydrofuran. After the immediate reaction has subsided, the mixture is refluxed for 4 hours, and is then treated with 10 ml. of methanol followed by 50 ml. of a 50–50 mixture of methanol and water. The mixture is filtered, and the filter cake, which consists chiefly of inorganic substances, is extracted twice with hot methanol and once with hot water. The combined extracts are evaporated in vacuo and the resulting residue is dissolved in ethanol. A small part of this residue consists of ethanol-soluble inorganic hydroxides, and Dry Ice (solid $CO_2$) is therefore added to convert these hydroxides to the corresponding carbonates. These carbonates, being

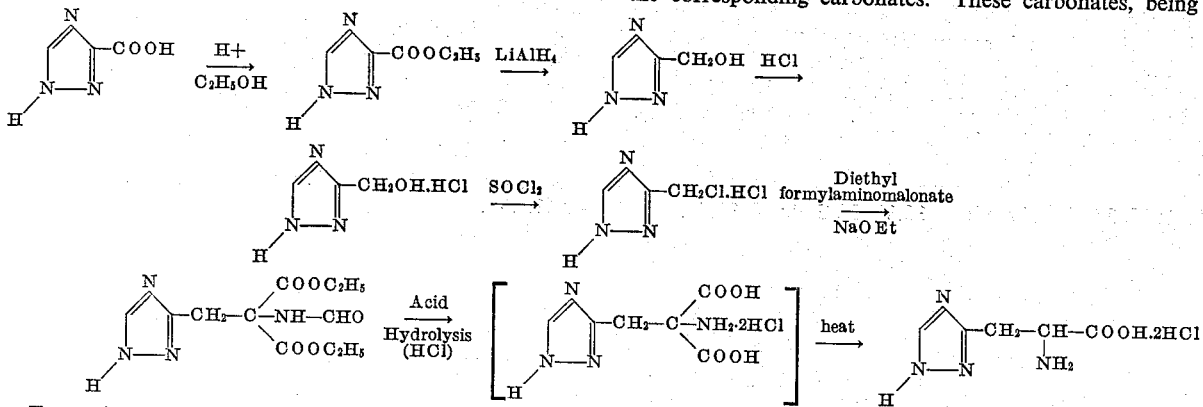

From the salt, the free amino acid can be prepared by methods applicable to amino acids generally, such as treatment with a suitable base; e. g., aniline, to liberate insoluble, separate from solution and are removed by filtration. On evaporation of the resulting filtrate in vacuo, an oily residue remains, consisting of 3-hydroxymethyl- 1,2,4-triazole. This oil is dissolved in dilute hydrochloric acid and on removal of the solvent in vacuo, yields a white solid, consisting of 3-hydroxymethyl-1,2,4-triazole hydrochloride. This solid, after crystalization from a mixture of methanol and ether, melts at about 150–153° C. and weighs 23 g.

Analysis.—Calculated for $C_3H_6ClN_3O$: C, 26.58; H, 4.46. Found: C, 26.74; H, 4.62.

*Preparation of 3-chloromethyl-1,2,4-triazole hydrochloride*

To 6.8 g. of 3-hydroxymethyl-1,2,4-triazole hydrochloride are added 100 ml. of thionyl chloride, and the mixture is refluxed for 4 hours. Upon cooling, a white solid consisting of 2-chloromethyl-1,2,4-triazole hydrochloride separates from solution. About 3 volumes of dry diethyl ether are added to complete the precipitation of this compound and the resulting suspension is filtered. Recrystallization of the filtered material from a mixture of alcohol and ether yields 7.7 g. of crystalline 2-chloromethyl-1,2,4-triazole hydrochloride melting at about 115–116° C.

Analysis.—Calculated for $C_3H_5Cl_2N_3$: C, 23.40; H, 3.27; N, 27.29. Found: C, 23.55; H, 3.38; N, 27.42.

*Preparation of β-(1,2,4-triazolyl-3)-alanine dihydrochloride*

2.3 g. of sodium are added to 100 ml. of absolute ethanol and after all the sodium has reacted, 10.2 g. of diethyl formylaminomalonate are added. The resulting mixture is cooled to 0° C., 7.7 g. of 3-chloromethyl-1,2,4-triazole hydrochloride dissolved in 100 ml. of absolute ethanol are added and the mixture is stirred for 6 hours. The alcohol is then removed in vacuo, and the solid residue is dissolved in 200 ml. of 2 normal hydrochloric acid. This acidic, aqueous solution is first extracted with ethyl acetate and then is made basic with sodium carbonate. The alkaline mixture is extracted with a mixture of equal parts of diethyl ether and ethyl acetate, and the extract is then evaporated in vacuo to remove the solvent, yielding diethyl (1,2,4-triazolyl-3-methyl)-formyl-aminomalonate as an oil. This oil is dissolved in 50 ml. of concentrated hydrochloric acid, and the solution is heated for about 10 hours on the steam bath, thereby hydrolysing the single amide and the two ester groups and causing the loss of one of the carboxyl groups. The resulting acidic solution of β-(1,2,4-triazolyl-3)-alanine is evaporated to dryness in vacuo. A solid residue of β-(1,2,4-triazolyl-3)-alanine dihydrochloride remains and this compound is purified by recrystalization from a mixture of ether and ethanol. The dihydrochloride forms hygroscopic crystals which have no definite melting point.

EXAMPLE 2

β-(1,2,4-TRIAZOLYL-3)-ALANINE 7 g. of β-(1,2,4-triazolyl-3)-alanine dihydrochloride are dissolved in 100 ml. of absolute ethanol and about 7 g. of aniline are added. β-(1,2,4-triazolyl-3)-alanine precipitates and is removed by filtration. It is purified by crystalization from aqueous ethanol. 5 g. of substantially pure material is obtained which melts at about 263–264° C.

Analysis.—Calculated for $C_5H_8N_4O_2$: C, 38.46; H, 5.16; N, 35.88. Found: C, 38.38; H, 5.28; N, 35.48.

EXAMPLE 3

β-(1,2,4-TRIAZOLYL-3)-ALANINE DINITRATE 5 g. of β-(1,2,4-triazolyl-3)-alanine are dissolved in dilute nitric acid containing two equivalents of nitric acid. On evaporation of the water in vacuo, a solid residue of β-(1,2,4-triazolyl-3)-alanine dinitrate remains. It is crystallized from an ethanol-ether mixture.

EXAMPLE 4

β-(1,2,4-TRIAZOLYL-3)-ALANINE HYDROBROMIDE 0.32 mol of HBr (as 48% solution in water) is diluted with 50 ml. of water and 5 g. of β-(1,2,4-triazolyl-3)-alanine are dissolved in the resulting solution. On evaporation of the water in vacuo, a solid residue of β-(1,2,4-triazolyl-3)-alanine hydrobromide remains.

Other mono- and dianionic salts of β-(1,2,4-triazolyl-3)-alanine can be obtained as described above by reacting the amino acid with a solution containing one or two molecular equivalents, respectively, of the desired acid. If the acid is non-volatile or if the acid is a volatile strong acid (HCl, HBr and the like), the salt is readily recovered by removing the solvent by evaporation in vacuo. If the acid is a volatile weak acid, the salt preferably is isolated from its solution by the addition of a miscible solvent in which the salt is relatively insoluble.

EXAMPLE 5

MONO-SODIUM SALT OF β-(1,2,4-TRIAZOLYL-3)-ALANINE 100 ml. of water solution containing 5 g. of β-(1,2,4-triazolyl-3)-alanine are neutralized to a pH of about 6 with dilute sodium hydroxide. A pH meter can be used to follow the neutralization. On evaporation of the solution to dryness in vacuo, a solid residue remains consisting of the mono-sodium salt of β-(1,2,4-triazolyl-3)-alanine.

EXAMPLE 6

DI-SILVER SALT OF β-(1,2,4-TRIAZOLYL-3)-ALANINE

To 50 ml. of hot water containing about 5 g. of β-(1,2,4-trazolyl-3)-alanine are added with stirring 8.8 g. of silver carbonate. The solid residue remaining after evaporaton consists of the di-silver salt of β-(1,2,4-triazolyl-3)-alanine.

Other mono- and di-cationic salts of β-(1,2,4-triazolyl-3)-alanine can be prepared as described above, by reacting the amino acid with one or two molecular equivalents, respectively, of the desired base.

We claim:
1. A compound chosen from the class consisting of β-(1,2,4-triazolyl-3)-alanine, and its metal salts, and its acid addition salts.
2. β-(1,2,4-triazolyl-3)-alanine.
3. A metal salt of β-(1,2,4-triazolyl-3)-alanine.
4. The mono-sodium salt of β-(1,2,4-triazolyl-3)-alanine.
5. An acid addition salt of β-(1,2,4-triazolyl-3)-alanine.
6. β-(1,2,4-triazolyl-3)-alanine dihydrochloride.
7. 3-chloromethyl-1,2,4-triazole.
8. 3-hydroxymethyl-1,2,4-triazole.

References Cited in the file of this patent

Sheehan et al., J. Am. Chem. Soc., vol. 71, pp. 1436–40 (1949).